Sept. 11, 1962 A. J. BUCHTENKIRCH ETAL 3,053,332
AUTOMATIC FILL-CONTROL SYSTEM
Filed May 1, 1958 7 Sheets-Sheet 3

INVENTORS
ARTHUR J. BUCHTENKIRCH,
WALTER LIPKIN, and
MALCOM D. WIDENOR
BY *Connolly and Hutz*
THEIR ATTORNEYS

INVENTORS
ARTHUR J. BUCHTENKIRCH,
WALTER LIPKIN, and
MALCOM D. WIDENOR
BY Connolly and Hutz
THEIR ATTORNEYS Sept. 11, 1962 A. J. BUCHTENKIRCH ET AL 3,053,332
AUTOMATIC FILL-CONTROL SYSTEM
Filed May 1, 1958 7 Sheets-Sheet 5

INVENTORS
ARTHUR J. BUCHTENKIRCH,
WALTER LIPKIN, and
MALCOM D. WIDENOR
BY *Connolly and Hutz*
THEIR ATTORNEYS

Fig.15.

United States Patent Office 3,053,332
Patented Sept. 11, 1962

3,053,332
AUTOMATIC FILL-CONTROL SYSTEM
Arthur J. Buchtenkirch, Glen Cove, Walter Lipkin, North Bellmore, and Malcolm D. Widenor, Glen Head, N.Y., assignors to Chas. Pfizer & Co., Inc., Brooklyn, N.Y., a corporation of Delaware
Filed May 1, 1958, Ser. No. 732,254
17 Claims. (Cl. 177—120)

This invention relates to a system for automatically regulating a device for filling containers with a flowing material, and more particularly relates to a system for electronically regulating a device for filling containers with powder.

The problem of consistently filling containers with exact weights of flowable manufactured compositions such as liquids or powders is complicated by a multitude of affecting variables. When the material dispensed is rather expensive, errors in filling attain a relatively great significance. This problem, therefore, assumes critical proportions in the pharmaceutical or drug industry in which small amounts of relatively expensive liquids and powders are packaged in small containers such as bottles or vials.

An existing device for filling small containers with powder or liquids includes either an auger of the helical screw type which is mounted within a conical funnel in line with its dispensing spout, or a pump. A machine of this type is, for example, made by G. Diehl Mateer & Co. of Devon, Pennsylvania. This illustrative machine utilizes a mechanical counter which operates the auger shaft or pump a predetermined number of revolutions to dispense substantially equal amounts of powder or liquid to successive containers. This mechanical regulating device operates satisfactorily as long as it is frequently checked to make sure that the physical characteristics of the dispensed material, for example powder, do not change in a way which causes variations in the weights of material dispensed to successive containers. This checking consumes valuable machine and labor time. However, even when the utmost vigilance is exercised, exact checking is usually not possible because the weights of the containers themselves vary, and it is not possible to obtain the tare weight of the container after it has been filled.

An object of this invention is to provide an automatic system for regulating a device for filling containers with a flowable material to provide substantially exact weights of the dispensed material throughout extended periods of operation.

Another object is to provide simple and dependable components for such a system.

In accordance with this invention, the tare and fill weights of successive containers are accommodated and measured within an electronic servomechanism loop which tares when closed and which provides an output signal corresponding to the measured fill weight when it is opened. The output signal provided by a weighing transducer when the loop is opened is compared with a reference signal corresponding to the desired weight. A fill-stop circuit for interrupting the filling device may thereby be actuated or the difference between these signals may be used to reset the reference signal or the filling device itself to dispense fill quantities closer to the desired fill weight. An averaging means may also be provided for resetting the fill-governing element in accordance with an average fill error instead of an individual error which might constitute a far less reliable basis for resetting. Each successive container may be tared and weighed, or any predetermined container or groups may be sampled.

The servomechanism loop may include a unique transducer and driver arrangement for taring and weighing. This transducer and driver incorporate a differential transformer having relatively movable parts and a driver motor connected to one of these parts. The object to be weighed causes relative movement of these transformer parts to generate a signal which is fed back through the servomechanism loop to operate the driver motor in a direction to reposition these parts in their original relative or null condition. A loud-speaker armature or vibrator-type driver motor invests the servomechanism loop with a high response speed and stability. When the fill material is added to the container, it causes a second relative movement between the differential transformer parts to generate a signal corresponding to the weight of the fill material added to the container.

The weighing platform or platen is supported, for example, from a resilient member. However, its weighing accuracy is free from conventional spring errors such as drift and hysteresis because of the unique taring action provided by the servomechanism loop and driver motor.

A tare memory element is incorporated in the servomechanism loop. It may, for example, incorporate a novel filter network including capacitance connected at one of its ends to the driver and separated from the transducer by a disconnecting switch which isolates the tare memory from the transducer while the fill is being weighed. This novel network, therefore, filters without affecting the characteristics of the opened servomechanism loop.

Novel features and advantages of the present invention will become apparent to one skilled in the art from a reading of the following description in conjunction with the accompanying drawings wherein similar reference characters refer to similar parts and in which.

Figures 1, 3:
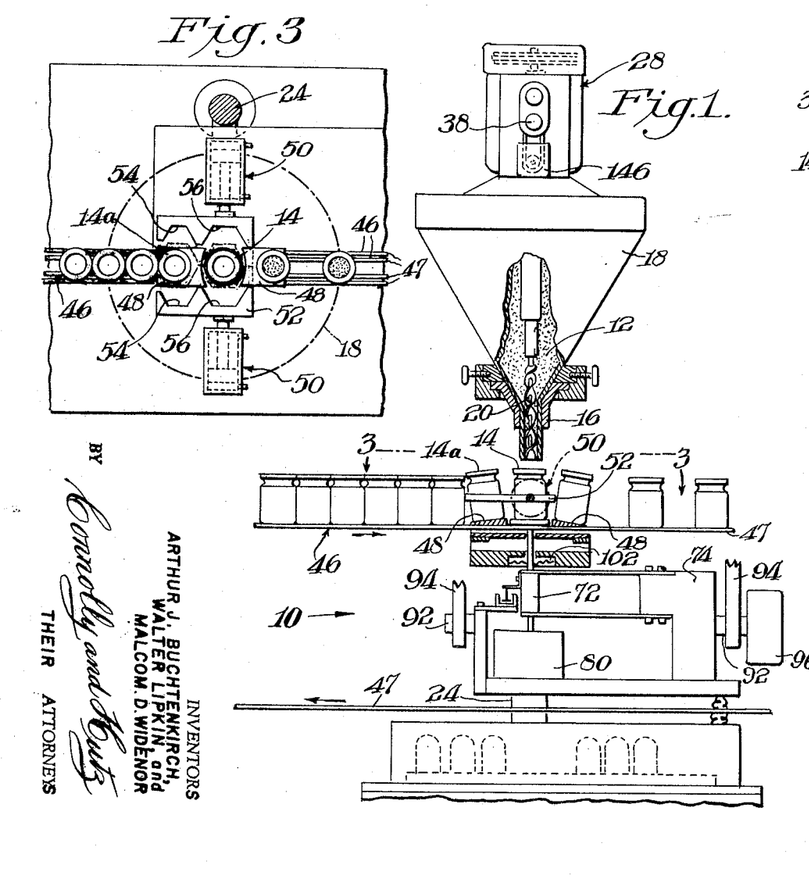
FIG. 1 is a view in elevation of one embodiment of this invention.
FIG. 3 is a cross-sectional view taken through FIG. 1 along the line 3—3 and looking in the direction of the arrows.

In FIG. 1 is shown a system 10 for automatically regulating and/or checking the amount of flowable material, for example powder 12, dispensed to successive containers 14, for example vials 14, through spout 16 of dispensing funnel 18. Funnel 18 is, for example, part of an existing mechanically-regulated apparatus for dispensing flowable materials, for example powders, in response to rotation of a helical screw-type auger 20 mounted within a conical funnel 18.

The aforementioned elements are, for example, part of an existing container filling machine 22 made by G. Diehl Mateer & Company of Devon, Pennsylvania. Machine 22 includes a post 24 extending, for example, vertically from a base 26 to support an operating head 28 at its upper end. Funnel 18 is mounted at one end of head 28, and a drive motor 30 and variable transmission 32, for example a series of pulleys of varying size, is mounted upon another portion of head 28. A mechanical drive is imparted to auger 20 by means of belts 34, for example, which connect the shaft of auger 20 with pulleys 32. A mechanical counter 36 and integral clutching arrangement is connected to belts 34 and to the shaft of auger 20. Counter 36, in synchronism with successive dispositions of containers under spout 16 of funnel 18, actuates auger 20 to intermittently turn through predetermined numbers of revolutions which causes fairly equal amounts of powder to be dispensed to successive containers 14. The setting of counter 36 can be varied by means of a control element 38 coupled to it.

Since the physical characteristics of a flowable material, for example powder 12, are subject to change during the process of filling a great number of vials 14, for example, because of changes in atmospheric conditions or compacting of the powder, an automatic device 10 for regulating and/or checking the amount of powder added to vials 14 is required to precisely maintain the dispensed quantities substantially constant. A slight variation in material dispensed can attain very great significance when relatively light powders of an expensive nature are packaged. Furthermore, accurate weight-checking of the filled containers is impossible because the weight of the containers themselves is great relative to that of the fill material, and varies over a wide range.

Figure 2:
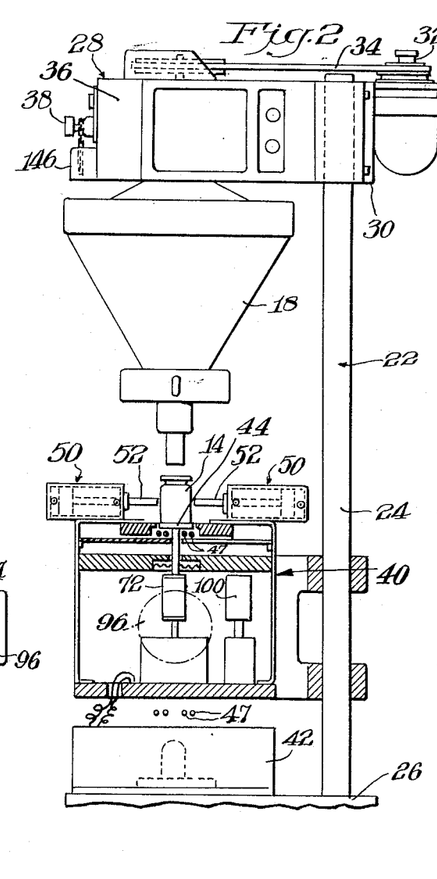
FIG. 2 is a sectional view taken through FIG. 1 along the line 2—2 and looking in the direction of the arrows.

System 10 includes, for example, a weighing transducer 40 and associated electronic components 42. Weighing transducer 40 is, for example, mounted upon post 24 in a position disposed directly below the path of travel of containers 14. Transducer 40 includes, for example, a weighing platen or platform 44. Containers 14 are conveyed towards and away from platen 44 upon an endless conveyor belt 46 which is made, for example, of four separate strands 47. As shown in FIGS. 2 and 3, platen 44 is positioned in line with and slightly above the upper portion of belt 46, and thin ramp plates 48 are disposed in front and in back of platen 44 to guide containers 14 successively upon and away from platen 44.

A pair of opposed reciprocating pusher units 50 are mounted over belt 46 in line with platen 44 for precisely positioning one container 14 at a time upon platen 44 and for holding back the succeeding container 14a. Pusher units 50 accordingly incorporate reciprocating plates 52 each of which include a holding recess 54 and a positioning recess 56. Plates 52 are first moved to a position lying completely clear of the path of movement of containers 14, as shown in solid line in FIG. 3, to allow them to pass unimpeded towards platen 44. When vial 14 is moved onto platen 44, plates 52 are simultaneously actuated by a timing mechanism (not shown) to move together center a vial 14 between centering recesses 56 and to hold back following vial 14a between holding recesses 54. Then plates 52 are moved slightly backward to the position shown in broken line in FIG. 3. This frees vial 14 upon platen 44 from interference with external influences during taring, filling, and weighing. The following vial 14a is held back from contact with vial 14 by partially withdrawn recesses 54. After the entire filling and weighing process (later described in detail) is completed, plates 52 are withdrawn to the position shown in solid line in FIG. 3 to permit filled container 14 to be pushed away by succeeding container 14a which is itself positioned between centering recesses 56 when plates 52 are once more moved together to repeat their centering and holding functions.

Figure 4:
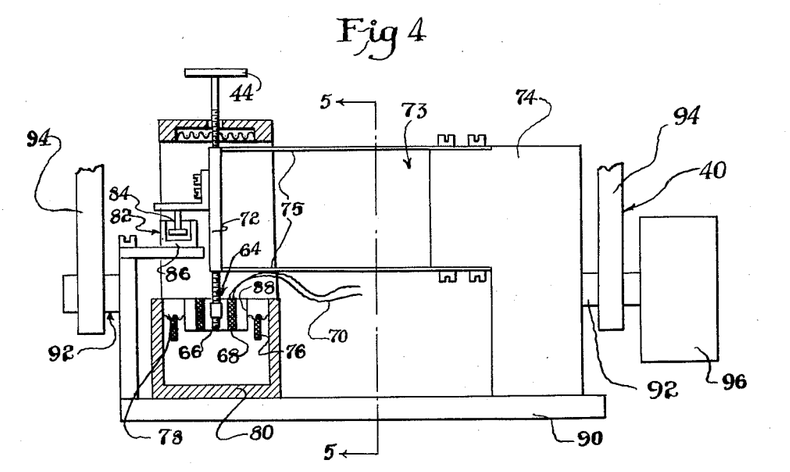
FIG. 4 is a view in elevation partially in cross-section of a portion of the embodiment shown in FIG. 1.
Figure 5:
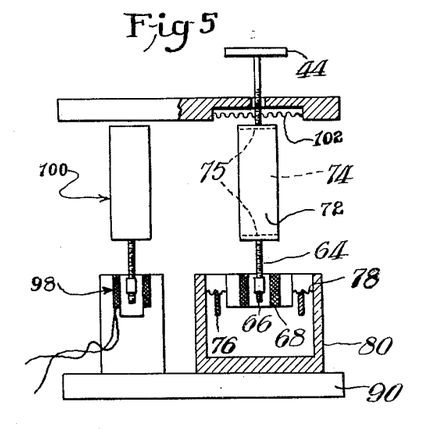
FIG. 5 is a cross-sectional view taken through FIG. 4 along the line 5—5 and looking in the direction of the arrows.

In FIGS. 4 and 5 are shown details of weighing transducer 40 which tares and weighs vials 14 with a high degree of accuracy and at a very high speed. Transducer 40 includes, for example, a differential transformer 64 including relatively movable core 66 and coil 68. Differential transformer 64 is, for example, a linear variable differential transformer of the type manufactured by Schaevitz Engineering of Camden, New Jersey, and which is described in their bulletin AA–1a, copyright 1955. Details of connection of coil 68 are later described in conjunction with FIG. 9. However, in general, differential transformer 64 in the central or null position provides a zero output. When core 66 and coil 68 are moved relative to each other from the null position, an output voltage is produced in coil 68 which varies linearly with change in core position. The output voltage, for example, derived from coil 68 through leads 70 is accordingly an indication of the amount of relative movement of core 66 and coil 68 from the null position.

Core 66 is, for example, attached to rod 72 which supports weighing platen 44. Rod 72 is resiliently mounted from a support block 74 by means of a pair of springs 75 which permit platen 44 to move distances substantially proportional to the weights imposed in general agreement with Hooke's law. These parts constitute a resilient suspension 73. However, it is known that the operating characteristics of practical spring materials deviate from that law which introduces deviations from a straight line relationship between weight and deflection. These errors, for example, hysteresis and drift, are eliminated by this novel device in a manner later described in detail.

Transducer 40 also includes a motor driven element 76, for example an actuating coil of the loud-speaker armature type, which is connected to a corrugated diaphragm 78 made, for example, of linen impregnated with a phenolic resin. Driver coil 76 and diaphragm 78 are, for example, mounted within a motor case 80 and these elements are commercially available in the form of a vibrator assembly, for example, from the Racon Company whose offices are located at 1261 Broadway, New York.

This vibrator or loud-speaker armature type driver motor including driver coil 76, diaphragm 78 and case 80, provides an extremely high speed and accurate means for moving coil 68 back to a null condition relative to core 66. However, other systems such as mechanical systems, for example rack and pinion gear or conventional gear trains driven by electric motors, might be utilized. The vibrator type motor described herein, however, has the additional advantage of permitting the servomechanism to operate over a band width from zero to 650 cycles per second, the natural frequency of the servo loop. This high frequency performance provides a servomechanism of unusual speed of response and great stability. It incorporates minimum inertia, as well as eliminating backlash and motor slot lock, which phenomena are inherent in conventional driver motors. Furthermore, this loudspeaker armature driver motor is infinitely variable and provides infinite resolution.

Accuracy and dependability of operation of this loud-speaker armature type motor driver may be enhanced, for example, by manufacturing corrugated diaphragm 78 of a resilient material having a minimum drift or creep. An advantageous material of this type is, for example, a spring alloy of the type described in U.S. Letters Patent No. 2,174,171 and sold under the name of Iso-Elastic by John Chatillon & Sons of New York.

In a manner later described in detail, the output signal provided from transformer coil 68 is fed back through a servo-mechanism loop including driver motor coil 76 which electromagnetically moves diaphragm 78 and transformer coil 68 and its casing 88 in a direction relative to transformer core 66 which re-establishes the null condition after core 66 has been moved away from it. Accordingly, when a weight is imposed upon platen 44 which moves core 66 downward from the null position, driver motor 76 is moved downward in response to the output signal from coil 68 a distance sufficient to substantially re-establish the null relationship between core 66 and coil 68. This feedback arrangement, in conjunction with a tare memory (later described), is used to tare the containers. The servomechanism attains a null steady state condition in approximately 0.01 of a second to prepare transducer 40 for weighing the material added to the container. However, approximately between 0.1 and 0.2 of a second was allowed for the taring operation to allow the comparatively slow speed spring suspension, for example, having a natural frequency from 12 to 15 c.p.s. to reach a steady state. This fill material causes a downward deflection of core 66 relative to coil 68 which is maintained stationary by the stored tare memory signal. An output signal is thereupon derived from coil 68 through lead 70 which is a function of the weight of the material added to the container. This signal is used in a manner later described in detail to regulate or check the amounts of fill material added to containers 14.

Weighing transducer 40 includes various mechanical and electrical components for eliminating and minimizing influences which may disturb its accuracy. Mechanical vibrations, for example, are absorbed and minimized, for example, by a piston damper assembly 82 including a piston 84 and an oil dashpot 86. Assembly 82 helps provide optimum speed of response with a minimum of oscillating movement of weighing platen 44.

The mount of motor 80 is, for example, constructed and arranged to have the same natural frequency and damping as that of the suspension supporting rod 72 and weighing platen 44. This causes case 88 and coil 68 which it supports, to move together with core 66 in response to disturbing vibration thereby producing no differential movement and resultant output. However, exact balancing is difficult to achieve, and case 80 is accordingly mounted upon a plate 90 which is suspended as a pendulum upon a knife-edged shaft 92 slung from supports 94 attached, for example, to a stationary portion or post 24 of machine 22. A vibration damper 96, for example, of the fluid torsion absorbing type is mounted upon an end of knife-edged shaft 92 for absorbing vibrations and producing a natural frequency of vibration substantially below the frequencies of any vibration which might disturb the operating accuracy of weighing transducer 40. This pendulum suspension functions as a very low pass filter which eliminates, for example, inputs of disturbing vibrations of the filling machine. Rod 72 is also supported upon another corrugated diaphragm 102, for example, made of Mylar film for preventing fill spillage from entering the weighing mechanism.

An electronic noise-filtering component, which is later described in detail, is incorporated in the tare memory component of the servomechanism loop. This noise-reducing component includes a low pass filter circuit including capacitance.

A combination electrical and mechanical vibration-eliminating or balancing device is provided by a vibration compensating transformer 98 similar to transformer 64 which is mounted upon a suspension 100 identical to the suspension 73 including rod 72 and springs 75 which supports weighing platen 44.

Compensator transformer 98 is electrically connected to weighing transformer 64 in an electrical summing circuit later discussed in conjunction with FIG. 9. This summing circuit opposes any vibrational signals introduced in transformers 64 and 98 which result in their cancelling and eliminating each other. The output signal from coil 68 is, therefore, a function only of the differential movements of suspensions 73 and 100, and does not incorporate a signal which is a function of the in-phase movement of suspensions 73 and 100. This cancelling of vibrational input makes it possible for transducer 40 to operate at very high accuracy and sensitivity.

Figure 6:
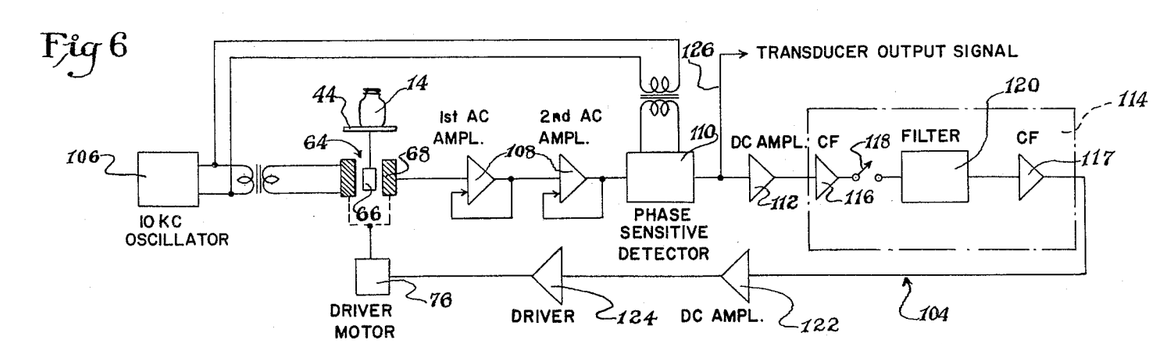
FIG. 6 is a schematic diagram of a portion of the embodiment shown in FIG. 1.

In FIG. 6 is shown a schematic diagram of weighing and taring servomechanism or feedback loop 104. Loop 104 includes, for example, an oscillator 106, for example, having a 10 kc. output. Oscillator 106 (shown in detail in FIG. 7) excites differential transformer 64 and compensating transducer 98 as shown in FIGS. 6 and 9. First and second A.C. amplifiers 108 (shown in detail in FIG. 10) amplify the signal from coil 68 and feed it to a phase-sensitive rectifier 110 shown in FIG. 11. Phase-sensitive rectifier or detector 110 is also excited by transformer coupling with 10 kc. oscillator 106.

Figure 8:
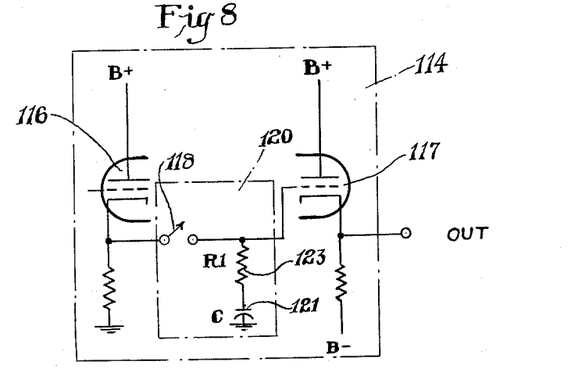
Figures 12, 13, 14:
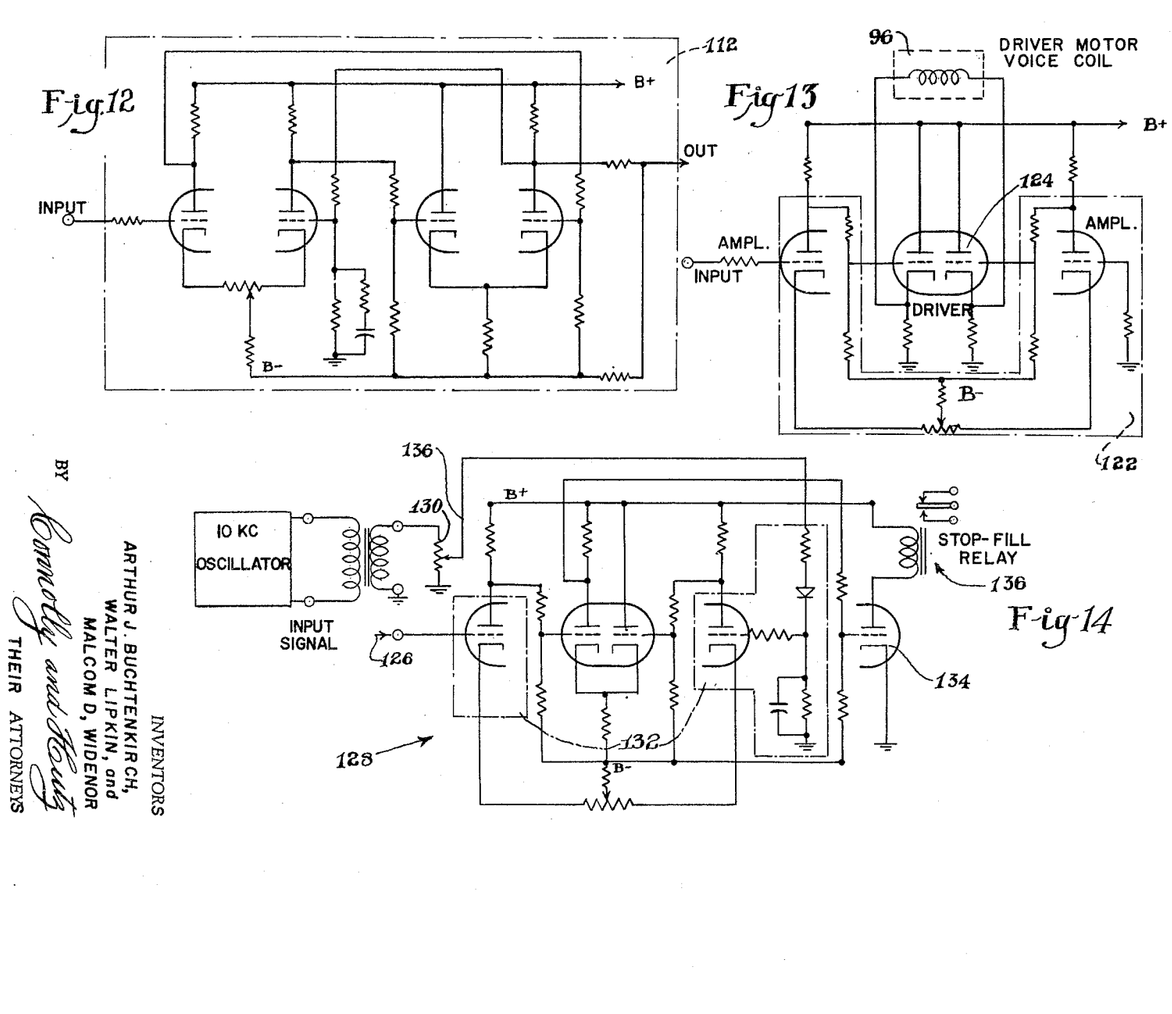
FIG. 14 is a circuit diagram of one example of another portion of the embodiment shown in FIG. 1.

The D.C. signal from phase-sensitive rectifier or detector 110 is amplified by D.C. amplifier 112 shown in FIG. 12, and fed into a tare memory circuit 114 shown in FIG. 8. Tare memory circuit 114, which includes a pair of cathode follower stages 116 and 117 separated by a disconnecting switch 118, has a filter component 120 connected between stages 116 and 117.

The signal from tare memory circuit 114 is fed through D.C. amplifier 122 shown in FIG. 13 to driver 124 also shown in FIG. 13. Driver 124 feeds driver motor 76 which repositions coil 68 in the null condition relative to core 66.

Figure 7:
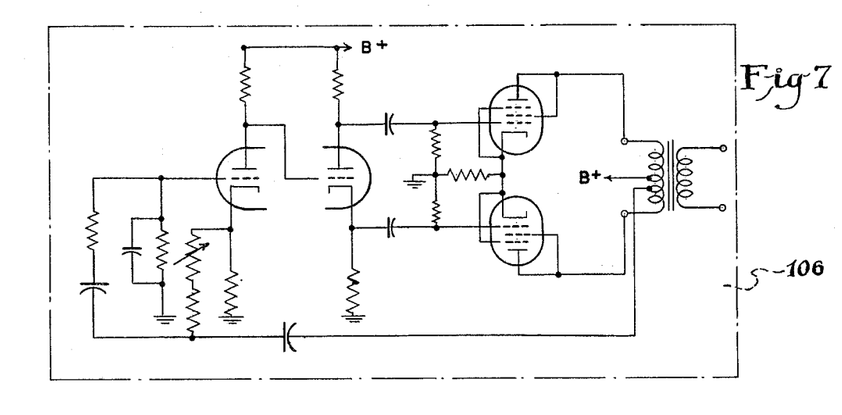
FIGS. 7–13 are circuit diagrams of individual parts of FIG. 6.

The circuit 106 shown in FIG. 7 is representative of a conventional circuit for an oscillator, and its individual components are accordingly not herein described in detail.

However, the tare memory circuit 114 shown in FIG. 8 incorporates a unique filter network component 120 which is novel and particularly advantageous because it permits all frequencies to be transmitted through to the driver motor when feedback loop 104 is closed although it is filtering out higher frequencies (noise) and permitting only lower frequency signals to be stored in memory capacitor 121 (shown in FIG. 8). This filter network, therefore, does not affect the high speed performance of the closed feedback loop even though it is filtering out higher frequency noise components of the signal from the memory storage circuit from which the tare memory signal is introduced into the opened feedback loop when disconnecting switch 118 is opened.

Filter circuit 120 is a network including capacitance represented by capacitor 121 and resistance represented by resistor 123. One end of network 120 is connected between cathode followers 116 and 117 on the side of disconnecting switch 118 which is connected to the driving motor portion of the servomechanism loop. A filter resistor 123 is connected in series with capacitor 121. A complex filtering network of suitable configurations may be incorporated in network 120 to provide improved operating characteristics, but network 120 is herein described merely as a series-connected resistor and capacitor to simplify the presentation. Network 120 connected as shown between cathode follower stages 116 and 117 charges capacitor 121 only to the average value of the D.C. component of the tare signal whereas the total signal including all frequency components and noise passes through cathode follower stages 116 and 117 to driver motor 76. This provides a highly accurate and sensitive tare memory signal which is stored in capacitor 121 for maintaining coil 68 firmly held in the tare null position after disconnecting switch 118 opens up the servomechanism loop.

Figure 9:
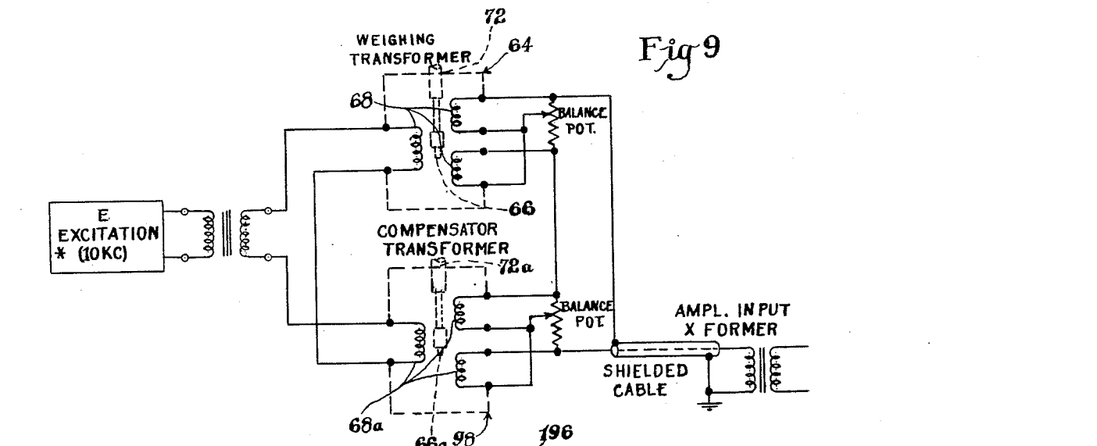

FIG. 9 represents the series summing circuit connection of coil 68 in the differential weighing and transformer 64 and analogous coil 68a in transformer 98. The relative positions of cores 66 and 66a are also shown. This series summing circuit is conventional and is accordingly not herein described in detail.

Figure 10:
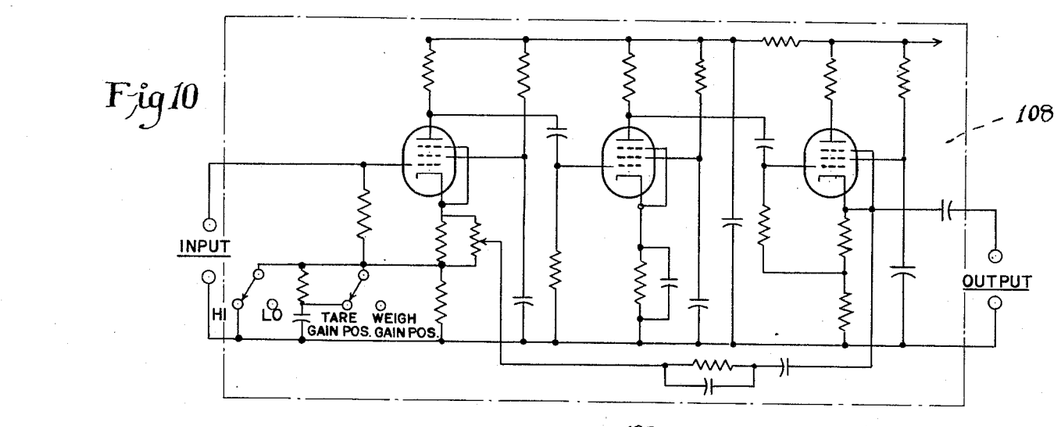
Figure 11:
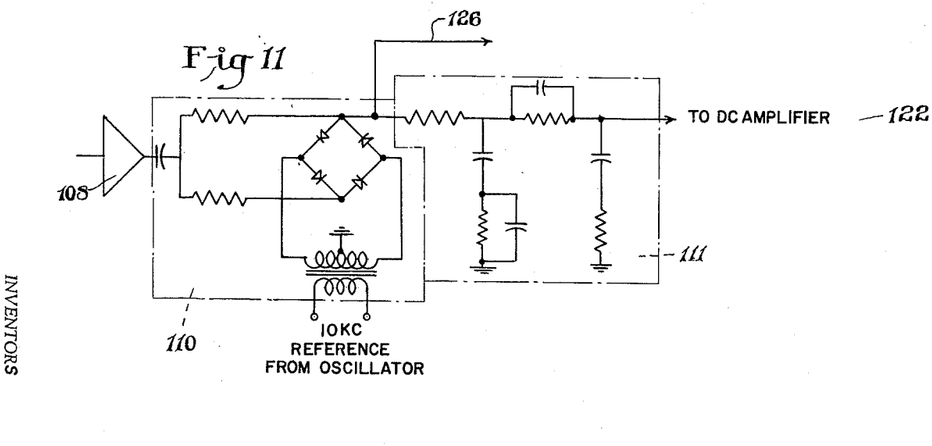

The A.C. amplifier 108 shown in FIG. 10, the phase-sensitive rectifier 110 shown in FIG. 11, the D.C. amplifier 112 shown in FIG. 12, and the D.C. amplifier 122 and driver 124 both shown in FIG. 13, all represent components of conventional circuitry and are accordingly not described herein in detail.

*Operation of Tare Servomechanism Loop*

When an empty container 14 is placed upon weighing platen 44, rod 72 moves downward together with core 66. An output signal is accordingly derived from coil 68 in A.C. form, for example, a 10 kc. carrier signal, modulated in amplitude with the signal of interest which is amplified in first and second amplifiers 108 and converted to a D.C. signal, which corresponds to the modulating envelope, by means of phase-sensitive rectifier or detector 110. Filter and stabilizing network 111 at the output end of rectifier 110 removes the 10 kc. ripple introduced by the oscillator and shapes the frequency characteristics of the servomechanism loop to make it stable when it is closed. When switch 118 is closed by a timing mechanism coordinated with the timing of filling machine 22 (not shown), the D.C. signal flows through tare memory circuit 114 and into driver 124 through D.C. amplifier 122. The signal from driver 124 is fed into driver motor 76 which repositions coil 68 in the null position relative to core 66. The precise null position is not achieved, but a condition which approaches the null and coincides with it for all practical purposes is achieved. An error in null positioning, for example, ranging from 0.002 to 0.008% is attainable which in conjunction with vibrational errors introduced by the filling machine, provides tare weight accuracy within 0.01% relative to the weight of an empty container 14.

After an adequate time, which may be as little, for example, as 0.2 of a second, elapses for the taring operation, switch 118 is opened whereupon charged capacitor 121 of tare memory circuit 114 holds case 88 and coil 68 at the taring zero signal or null position. The filling operation is then initiated by the timing mechanism (not shown) a sufficient time after initiation of the taring process to insure its completion. As container 14 is filled, a voltage proportional to the net weight of the fill material alone is amplified and converted to D.C. by elements 108 and 110. Since switch 118 is now open, this output signal is fed through an output lead 126 to be utilized in a variety of ways later described in detail, for example, to either interrupt operation of the filling device and/or to provide an indication of the weight of the material added to the container.

*Fill-Stop Circuit*

When fill-stop circuit 128 shown in FIG. 14 is connected to output lead 126, the signal derived from phase-sensitive detector 110 is compared with a reference signal derived from an oscillator which, for example, may also be oscillator 106 shown in FIG. 6. A potential-varying device 130 is connected in the circuit to provide a means for varying the reference signal. This device may be either manual or automatic and may be moved by well-known mechanical or electrical means, such as a solenoid. An electronic potential-varying circuit might also be utilized to provide a system free of moving parts.

Fill-stop circuit 128 includes, for example, a differential D.C. amplifier or a comparison circuit 132 of conventional configuration, a switching tube 134, and a stop-fill relay 136. When the weighing signal is equal to or more than a predetermined amount less than the reference signal, the stop-fill relay 136 is operated to interrupt the revolution of the shaft auger 20 of the filling machine thereby terminating the filling operation. Since auger 20 cannot immediately stop its operation and some overshoot must occur, the reference voltage is adjusted to interrupt operation early enough to compensate for this overshoot. Even so, accuracies with such a system have been achieved having an average deviation of only 36 milligrams out of a 1.3 gram total fill. This is a substantial improvement when compared to the better than 200 milligram average deviation for the same total weight of fill when the same machine is operated under standard mechanically regulated conditions. In achieving this 6 to 1 improvement, the weighing and taring system operates at an accuracy of approximately 0.01%, or at an error of only one part in ten thousand even under the influence of an excessive amount of ambient vibration or noise. The influence of this noise can be removed to result in further improvement in accuracy of measurement.

The taring and servomechanism loop incorporating the unique driver provides an output signal which is an extremely reliable indication of the weight of the container and material. This loop and included components, in itself, therefore, constitutes an extremely high speed and exact weighing device. It utilizes resilient members which themselves are subject to deviation from linearity of response to a varying load, but the operating characteristics of this loop are made remarkably independent of these normal spring deviations such as drift, hysteresis or creep, because of its novel configuration. This independence is made possible by the high speed succession of taring and weighing operations effected by the high speed of response of the servomechanism loop. Since the taring and weighing occur almost simultaneously, there is no time for drift, creep, or hysteresis errors to be introduced into the system between the time of taring and weighing. The taring operation, therefore, eliminates errors inherent in the spring suspension in addition to taring the containers which hold the fill material.

*Semi-Automatic Weight Checking Circuit*

Figure 15:
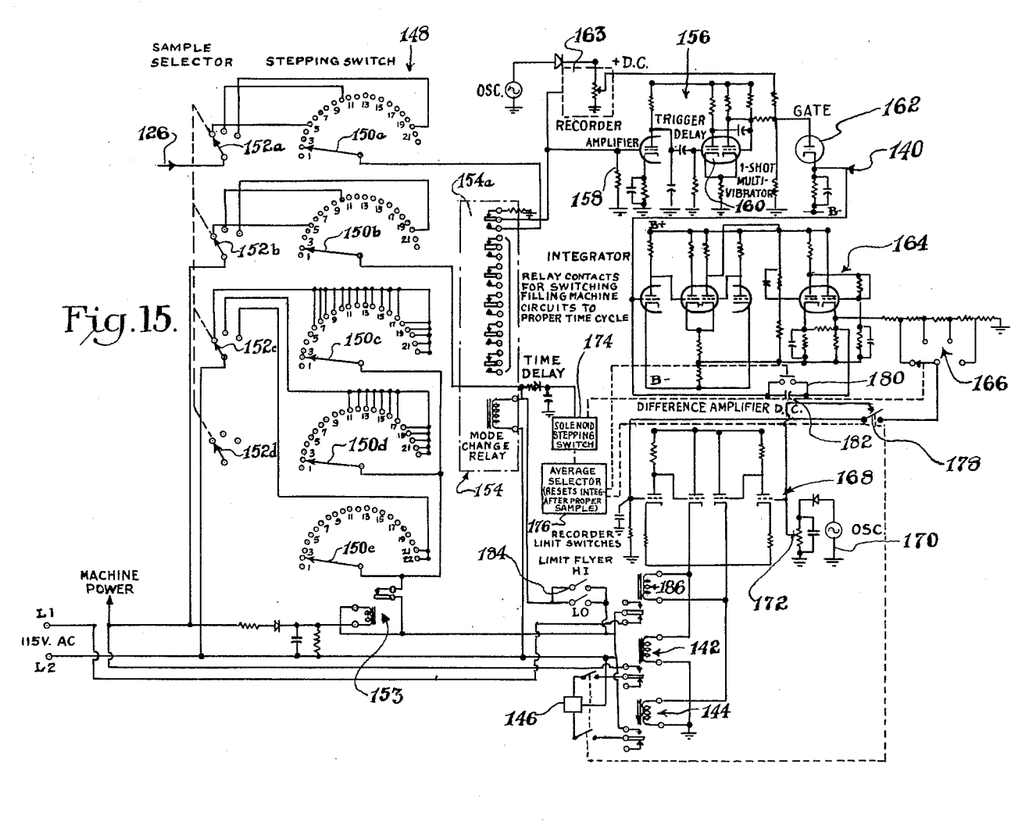
FIG. 15 is a circuit diagram of another example of another portion of the embodiment shown in FIG. 1.

In FIG. 15 is shown a system 140 for use in conjunction with a filling machine controlled by a conventional mechanical counter. System 140 checks the accuracy of operation of the counter at predetermined intervals and accordingly varies the setting of, for example, a mechanical counter which controls operation of the filling machine auger.

System 140, for example, derives an input signal from output lead 126 associated with servomechanism loop 104 shown in FIG. 6, and generates a correcting signal which is applied through cathode relays 142 and 144 (shown at the viewer's lower right hand corner of FIG. 15) to a correcting mechanism 146, for example, an electrically actuated device which physically rotates control element 38 in either direction to vary the number of rotations that the auger turns during each filling cycle. Counter mechanism 36 is, for example, an Eagle-Signal reset counter and correcting mechanism 146 is, for example, manufactured by the Newton Company of Newton, Massachusetts. Mechanism 146 is, for example, connected as shown in FIGS. 1 and 2 mounted upon or adjacent control 38 for counter mechanism 36.

System 140 includes a means for sampling predetermined samples of filled containers for check-weighing their contents during the normal cycle of operation. This selecting means is, for example, a 5-element stepping switch 148 which is, for example, of the type manufactured and sold, for example, by C. P. Clare & Company of Chicago, Illinois. Moving elements 150a, b, c, d and e of stepping switch 148 move one position each time a bottle is filled by the machine. Stepping switch 148, as shown for example, may be adjusted to reset after each group of 5, 10 or 20 samples. After a predetermined number of bottles, either 5, 10 or 20, as determined by sample selector switches 152a, b, c and d, have been filled, mode change relays 154 are energized by means of a pulse transmitted through stepping switch element 150b and sample selector element 152b to coordinate the timing of the filling cycle of machine 22 with the electronic taring and weighing systems. Stepping switch elements 150c, d and e control the resetting of the stepping switch motor respectively at intervals of 5, 10 and 20 containers through relay 153.

The weighing signal provided through output lead 126 is accordingly fed through relay element 154a to recorder 163 and to an electronic delay and trigger circuit 156 including amplifier 158 and single shot multivibrator 160 which in turn is connected to provide a delayed opening pulse to gating circuit 162. Recorder 163, for example, has a potentiometer driven by an output shaft which provides a voltage output proportional to the weighing signal fed to recorder. This voltage is, for example, proportional to the deviation from the desired fill weight. The output fed from recorder 163 through gating circuit 162 is, therefore, a pulse of fixed time duration and of an amplitude which varies in accordance with the strength of the input signal which has been fed into recorder 163.

Gating tube 162 in response to the delayed triggering pulse provided by multivibrator 160 feeds the aforementioned variable amplitude signal to integrator or memory circuit 164. The pulse is fed to the integrating amplifier 164 which has a relatively long time constant, and it accordingly accurately maintains a sustained output voltage for a period of several minutes. The circuit of integrator 164 is unique, and includes a capacitor 182 and a scaling factor switch 166 whose operation is later described in detail.

As the machine filling cycle repeats and the stepping switch homes to the starting position from a sampling position, for example, the number 5 position, a sample is accordingly taken for every 5 units filled. These signals are stored in the integrating circuit. A variable resistor 166 is included in the integrator circuit 164 for adding resistance into the integrator circuit as each pulse is applied to maintain an output proportional to the sum of the fill weights in each of the containers weighed. Variable resistor 166 accordingly applies a scaling factor to maintain the integrator output proportional to the average of the fill weights. A portion of the output from integrator 164 is fed to a D.C. difference amplifier 168 which compares this average signal with a reference signal provided by an oscillator 170 which corresponds to the desired fill weight. This reference signal can be varied by means of a variable resistor 172.

If the integrated voltage provided from difference amplifier 168 differs from the reference signal by more than a predetermined amount when switch 78 closes, one of two cathode relays 142 or 144 are energized to actuate correcting mechanism 146 which operates a reset timer, for example, to adjust the counter of the filling machine in a direction which changes its output to make it more nearly correspond to the desired fill weight. The filling machine then fills the next container as the circuits are all reset by the homing movement of stepping switch 148 and solenoid stepping switch 174. Average selector switch 176 is connected to stepping switch 174 and resets output switch 178 between the integrator and difference amplifier to the opened position in preparation for the next input of the signals to integrator 164. Switch 178 is closed one step prior to the reset by connection with the average selector in the manner shown. Solenoid stepping switch 174 closes switch 180 upon reset or homing to discharge averaging capacitor 182 by shunting it to prepare integrator circuit 164 for the next group of samples.

During the averaging operation, the signals fed to recorder 163 are recorded, for example, by a pen and ink trace on a moving chart to give a visual indication to the operator of the trend of the variance of fill weight. Recorder 163, itself, may, therefore, be used to indicate to an operator when to manually re-adjust the counter.

Additional relay and limit switches are provided to immediately repeat a sample weighing if a weight is detected which lies outside the prescribed upper and lower limits. High and low switches 184, for example, mounted at physical limits of travel of recorder 163 stop the machine if an abnormally high or low fill weight is detected. When either of switches 184 is actuated, the mode change relay is maintained energized to prevent the filling machine from returning to normal operation and to cause it to take another slow speed sample. At this time another relay (not shown) is energized to prevent the gating pulse from admitting the abnormal signal to the integrator. When the recorder moves off the limit position, switch 184 resets. Relay 186 is an out of tolerance relay which is adjusted to be actuated when the average weight signal deviates from a specified range. It then energizes circuits which, for example, cut off power to the filling machine and sound an alarm bell.

*Fully Automatic System*

Figure 16:
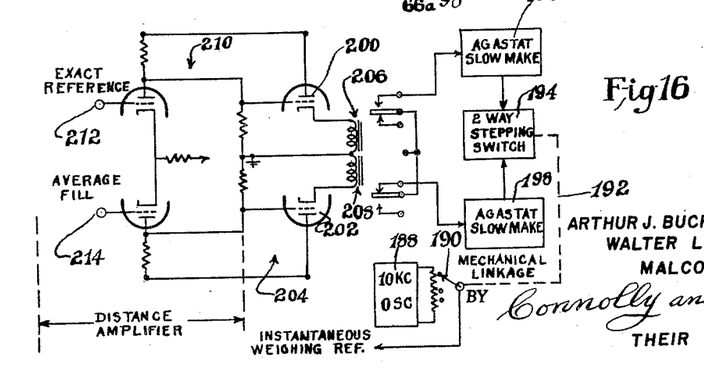
FIG. 16 is a circuit diagram of a further example of another portion of the embodiment shown in FIG. 1.

FIG. 16 illustrates components which are associated with portions of the circuit shown in FIGS. 6, 14 and 15 to provide a system which utilizes the output signal to automatically terminate the filling operation of the auger and which also weighs each filled vial to develop a correction factor for the instantaneous reference signal provided to the stop-fill circuit 128 shown in FIG. 14. The instantaneous or fill-stop reference signal is provided, for example, from an oscillator 188, for example, having a 10 kc. output. Oscillator 188 includes a movable contact 190 connected through mechanical linkage 192 to a two-way stepping switch 194. Stepping switch 194 is connected to two relays 196 and 198 which are connected to output stages 200 and 202 of difference amplifier 204 which are connected 180° out of phase with each other. Output stages 200 and 202 are respectively connected through relays 206 and 208 which are in turn respectively connected to slow-make relays 196 and 198, for example, of the Agastat type which actuate two-way stepping switch 194 in opposite directions in accordance with the desired polarity of the correcting signal.

The correcting signal is derived from a difference amplifier or primary comparing means 210 into which an exact reference signal corresponding to the precise desired fill weight is fed through terminal 212. The measured signal is fed into difference amplifier 210 through terminal 214. This measured signal is, for example, an average type signal of the type derived from integrator 164.

The instantaneous reference signal fed to fill-stop comparison circuit 132, shown in FIG. 14, is accordingly adjusted in response to the deviation of the fill from the precise desired fill. This empirically adjusts the terminating time of the counter earlier or later to provide fills closer to the desired fill weight. Predictable errors such as overshoot are accordingly compensated. Use of the average of a number of previous fills for deriving the correcting signal insures that a single abnormal weight will not throw the instantaneous reference signal off stride.

The entire control system, shown encased in two units 40 and 42 in FIGS. 1 and 2 may be incorporated, if desired, in a single casing, and either the single or multiple casings may be maintained under positive filtered air pressure to prevent dust and any other foreign matter from entering the system.

What is claimed is:

1. A system for automatically regulating a device for filling containers with a flowing material comprising a servomechanism loop including a weighing transducer, a tare memory, a driver and a driver motor; said weighing transducer including relatively movable components which provide a signal when physically displaced from a null condition with respect to each other; a weighing platform connected to one of said relatively movable components to constitute it as a weighing component; the other of said components being electrically connected to said loop to constitute it as a signal component; said driver motor being mechanically connected to said signal component for physically positioning it in said null condition with reference to said weighing component in response to a taring signal transmitted through said loop whereby it assumes a tared position; a switch in said loop beween said weighing transducer and said tare memory element which transmits a null positioning signal through said loop when closed and which isolates said tare memory, said driver and said driver motor from said weighing transducer when opened to cause said taring signal to be held in said tare memory for maintaining said signal component in said tared condition while weight is added to said transducer to provide a signal through said transducer which is a function of said added weight; an auxiliary circuit and actuating means operatively connected with said filling device for adjusting the operation of said filling device in accordance with said weighing signal; and an output lead connected to said loop between said weighing transducer and said switch and to said auxiliary circuit and actuating means for transmitting said weighing signal to said auxiliary circuit when said switch is opened.

2. A system as set forth in claim 1 wherein said auxiliary circuit is constructed and arranged to stop the operation of said filling device when said weighing signal differs from a reference signal by less than a predetermined amount, said auxiliary circuit including a relay connected to said filling device for interrupting its operation, a fill-stop comparing circuit, means for applying a reference signal to said fill-stop comparing circuit, input means connected to said fill-stop comparing circuit for feeding in an input signal corresponding to said weighing output signal from said servomechanism loop, and said fill-stop comparing circuit including switching means for operating said relay when said weighing signal differs less than a predetermined amount from said reference signal.

3. A system as set forth in claim 2 wherein said fill-stop comparing circuit includes a differential direct current amplifier circuit.

4. A system for automatically regulating a device for filling containers with a flowing material comprising a servomechanism loop including a weighing transducer, a tare memory, a driver and a driver motor; said weighing transducer including relatively movable components which provide a signal when displaced from a null condition; said driver motor being connected to one of said relatively movable components of said transducer for positioning said relatively movable components in said null condition in response to a taring signal transmitted through said loop; a switch in said loop between said weighing transducer and said tare memory element which transmits a null positioning signal through said loop when closed and which isolates said tare memory, said driver and said driver motor from said weighing transducer when opened to maintain said transducer in said tared null condition while weight is added to said transducer; an auxiliary circuit and actuating means operatively connected with said filling device for adjusting the operation of said filling device in accordance with said weighing signal; an output lead connected to said loop between said weighing transducer and said switch and to said auxiliary circuit and actuating means for transmitting said weighing signal to said auxiliary circuit when said switch is opened, said auxiliary circuit being constructed and arranged to stop the operation of said filling device when said weighing signal differs from a reference signal by less than a predetermined amount; said auxiliary circuit including a relay connected to said filling device for interrupting its operation; a fill-stop comparing circuit; means for applying a reference signal to said fill-stop comparing circuit; input means connected to said fill-stop comparing circuit for feeding in an input signal corresponding to said weighing output signal from said servomechanism loop; said fill-stop comparing circuit including switching means for operating said relay when said weighing signal differs less than a predetermined amount from said reference signal; primary comparing means being operatively connected with said output lead of said servomechanism loop and with said fill-stop comparing circuit; an exact reference signal corresponding to the exact desired fill weight being fed into said primary comparing means; and adjusting means connecting said primary comparing means with said fill-stop comparing means for varying said fill-stop reference signal in accordance with the variance of the measured fill weights from the exact desired fill weight.

5. A system for automatically regulating a device for filling containers with a flowing material comprising a servomechanism loop including a weighing transducer, a tare memory, a driver and a driver motor; said weighing transducer including relatively movable components which provide a signal when displaced from a null condition; said driver motor being connected to one of said relatively movable components of said transducer for positioning said relatively movable components in said null condition in response to a taring signal transmitted through said loop; a switch in said loop between said weighing transducer and said tare memory element which transmits a null positioning signal through said loop when closed and which isolates said tare memory, said driver and said driver motor from said weighing transducer when opened to maintain said transducer in said tared null conditon while weight is added to said transducer; an auxiliary circuit and actuating means operatively connected with said filling device for adjusting the operation of said filling device in accordance with said weighing signal; an output lead connected to said loop between said weighing transducer and said switch and to said auxiliary circuit and actuating means for transmitting said weighing signal to said auxiliary circuit when said switch is opened; independently regulated control means being connected with said filling device for causing it to operate through periods of predetermined duration; a comparing circuit; means for applying a reference signal to said comparing circuit; sampling means operatively connecting said servomechanism loop with said comparing circuit for checking the weights of predetermined containers; correcting means connected with said independent control means for varying its setting in accordance with the weights of said weighed samples; and relay means connecting said comparing circuit with said correcting means for varying said setting in accordance with the weights of said weighed samples.

6. A system as set forth in claim 5 wherein said independently regulated control means includes a mechancal revolution counter, said sampling means is comprised of a stepping switch, said comparing circuit is comprised of a difference amplifier, and relays connect said difference amplifier with said correcting means for varying the setting of said mechanical counter means in accordance with the deviation of said measured weight from said reference signal applied to said difference amplifier.

7. A system as set forth in claim 1 wherein a phase-sensitive rectifier is connected in said loop between said transducer and said tare memory.

8. A weighing device comprising a servomechanism loop including a weighing transducer, a tare memory, a driver and a driver motor; said weighing transducer including relatively movable components which provide a signal when displaced from a null condition; said driver motor being connected to one of said relatively movable components of said transducer for positioning said relatively movable components in said null condition in response to a taring signal transmitted through said loop; a switch in said loop between said weighing transducer and said tare memory element which transmits a null positioning signal through said loop when closed and which isolates said tare memory, said driver and said driver motor from said weighing transducer when opened to maintain said transducer in said tared null condition while weight is added to said transducer; an output lead connected to said loop between said weighing transducer and said switch for providing a signal corresponding to said weight; said tare memory incorporating a filter network including a memory capacitor; and one end of said filter network being connected to said loop between said switch and said driver for permitting all frequencies in said signal to pass through said closed servomechanism loop to said driver while only lower frequencies are permitted to pass into said memory capacitor from which they are introduced through said opened loop to said driver for maintaining said transducer in said tared null condition.

9. A system as set forth in claim 8 wherein said tare memory includes a cathode follower stage disposed on both sides of said switch, said filter network includes a resistor, and said filter network is connected to said stage disposed on the side of said switch remote from said transducer.

10. A weighing device comprising a servomechanism loop including a weighing transducer, a tare memory, a driver and a driver motor; said weighing transducer including relatively movable components which provide a signal when physically displaced from a null condition with respect to each other; a weighing platform connected to one of said relatively movable components to constitute it as a weighing component; the other of said components being electrically connected to said loop to constitute it as a signal component; said driver motor being mechanically connected to said signal component for physically positioning it in said null condition with reference to said weighing component in response to a taring signal transmitted through said loop whereby it assumes a tared position; a switch in said loop between said weighing transducer and said tare memory element which transmits a null positioning signal through said loop when closed and which isolates said tare memory, said driver and said driver motor from said weighing transducer when opened to cause said taring signal to be held in said tare memory to maintain said other of said components in said tared condition while weight is added to said transducer to provide a signal through said transducer which is a function of said added weight; and an output lead connected to said loop between said weighing transducer and said switch for providing a signal corresponding to said weight.

11. A system as set forth in claim 10 wherein said driver motor is comprised of a loud-speaker type armature coil and diaphragm for providing relatively high speed response and stable frequency characteristics to said servomechanism loop.

12. A system as set forth in claim 10 wherein said transducer includes a platen element, said platen element being resiliently mounted upon spring members, and said servomechanism loop eliminating deviations in the motion of said resilient members from Hooke's law by means of a rapid succession of closed-loop taring and opened-loop weighing signal generation.

13. A system for automatically regulating a device for filling containers with a flowing material comprising a servomechanism loop including a weighing transducer, a tare memory, a driver and a driver motor; said weighing transducer including relatively movable components which provide a signal when displaced from a null condition; said driver motor being connected to one of said relatively movable components of said transducer for positioning said relatively movable components in said null condition in response to a taring signal transmitted through said loop; a switch in said loop between said weighing transducer and said tare memory element which transmits a null positioning signal through said loop when closed and which isolates said tare memory, said driver and said driver motor from said weighing transducer when opened to maintain said transducer in said tared null condition while weight is added to said transducer; an auxiliary circuit and actuating means operatively connected with said filling device for adjusting the operation of said filling device in accordance with said weighing signal; an output lead connected to said loop between said weighing transducer and said switch and to said auxiliary circuit and actuating means for transmitting said weighing signal to said auxiliary circuit when said switch is opened; independently regulated control means being connected with said filling device for causing it to operate through periods of predetermined duration; a comparing circuit; means for applying a reference signal to said comparing circuit; sampling means operatively connecting said servomechanism loop with said comparing circuit for checking the weights of predetermined containers; correcting means connected with said independent control means for varying its setting in accordance with the weights of said weighed samples; relay means connecting said comparing circuit with said correcting means for varying said setting in accordance with the weights of said weighed samples; said independently regulated control means including a mechanical revolution counter; said sampling means being comprised of a stepping switch; said comparing circuit being comprised of a difference amplifier; relays connecting said difference amplifier with said correcting means for varying the setting of said mechanical counter means in accordance with the deviations of said measured weight from said reference signal applied to said difference amplifier; an integrating means being connected between said sampling means and said difference amplifier; said integrating means including a capacitor whose charge corresponds to the sum of a group of weighing signals transmitted thereto; and a variable resistor being connected to said integrating means to add resistance as each successive pulse is transmitted to said integrating means to provide a scaling factor for causing the charge upon said resistor to correspond to the average value of said signals in said predetermined group.

14. A system as set forth in claim 13 wherein delay and gating means are connected between said sampling means and said integrating means to selectively permit signal pulses to flow through said gating means into said integrator, and reset means is connected to said integrating means to connect it to said difference amplifier one step before the last signal of said group and to discharge said capacitor after the last signal in said group has been transmitted.

15. A weighing device comprising a servomechanism loop including a weighing transducer and a driver motor, said weighing transducer including relatively movable components which provide a signal when displaced from a null condition with respect to each other, a weighing platform connected to one of said relatively movable components to constitute it as a weighing component, said driver motor being mechanically connected to another of said components for positioning it in said null condition with reference to the position of said weighing component in response to a taring signal transmitted through said loop whereby it assumes a tared position, and said driver motor being comprised of a loud-speaker type armature coil and diaphragm for imparting high speed response and stable frequency characteristics to said servomechanism loop.

16. A weighing device as set forth in claim 15 wherein said weighing transducer includes a core and coil, said weighing component comprising said core, and said other component comprising said coil.

17. A weighing device as set forth in claim 16 wherein said core and coil are part of a single differential transformer.

References Cited in the file of this patent

UNITED STATES PATENTS

| | | |
|---|---|---|
| 2,610,052 | MacGeorge | Sept. 9, 1952 |
| 2,628,055 | Knobel et al. | Feb. 10, 1953 |
| 2,664,557 | Sargrove | Dec. 29, 1953 |
| 2,688,459 | Merrill et al. | Sept. 7, 1954 |
| 2,712,408 | Weber | July 5, 1955 |
| 2,728,285 | Bradley et al. | Dec. 27, 1955 |
| 2,763,457 | Gregory | Sept. 18, 1956 |
| 2,767,974 | Ballard et al. | Oct. 23, 1956 |
| 2,780,101 | Kinkel | Feb. 5, 1957 |
| 2,793,026 | Giardino et al. | May 21, 1957 |
| 2,829,856 | Gregory | Apr. 8, 1958 |
| 2,851,063 | Leinhart | Sept. 9, 1958 |
| 2,925,983 | Kennaway | Feb. 23, 1960 |
| 2,926,010 | Kennaway | Feb. 23, 1960 |

FOREIGN PATENTS

| | | |
|---|---|---|
| 771,052 | Great Britain | Mar. 27, 1957 |